US011161487B2

(12) United States Patent
Miller, Jr. et al.

(10) Patent No.: US 11,161,487 B2
(45) Date of Patent: Nov. 2, 2021

(54) SYSTEM AND METHOD FOR CONTROLLING WHEEL BRAKES IN A VEHICLE PLATOONING WITH ANOTHER VEHICLE

(71) Applicant: Bendix Commercial Vehicle Systems LLC, Elyria, OH (US)

(72) Inventors: Thomas S. Miller, Jr., Lagrange, OH (US); Phillip J. Kasper, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 232 days.

(21) Appl. No.: 16/541,471

(22) Filed: Aug. 15, 2019

(65) Prior Publication Data
US 2021/0046912 A1 Feb. 18, 2021

(51) Int. Cl.
*B60T 8/1761* (2006.01)
*B60T 8/17* (2006.01)
(Continued)

(52) U.S. Cl.
CPC ........ *B60T 8/17616* (2013.01); *B60T 8/1701* (2013.01); *G05D 1/0293* (2013.01); *G08G 1/0965* (2013.01); *G08G 1/22* (2013.01)

(58) Field of Classification Search
CPC ...... G08G 1/22; G08G 1/0965; G05D 1/0287; G05D 1/0291; G05D 1/0293;
(Continued)

(56) References Cited

U.S. PATENT DOCUMENTS 5,011,236 A 4/1991 Toepfer et al.
5,568,388 A 10/1996 Schnerer et al.
(Continued)

FOREIGN PATENT DOCUMENTS

CN 101414188 A 4/2009
DE 10 2005 051 436 A1 5/2007
(Continued)

OTHER PUBLICATIONS

Aly, Ayman A. et al., "An Antilock-Braking Systems (ABS) Control: A Technical Review," 2 Intelleigent Control and Automation pp. 186-195 (2011).
(Continued)

*Primary Examiner* — Khoi H Tran
*Assistant Examiner* — Tanner L Cullen
(74) *Attorney, Agent, or Firm* — Reising Ethington P.C.

(57) ABSTRACT

A system for controlling wheel brakes in a first vehicle platooning with a second vehicle includes a transceiver in the first vehicle that receives a brake command from the second vehicle to apply a wheel brake in the first vehicle. A controller in the first vehicle generates, responsive to the brake command, a first set of control signals that control delivery of fluid pressure to the wheel brake and implement a braking event. The controller may further detect a wheel slip condition indicative of slip in a wheel of the first vehicle during the braking event and generate, when the condition occurs, a second set of control signals to control delivery of fluid pressure to the wheel brake. The control signals are generated in accordance with braking profiles that differ from braking profiles used by the controller during braking events occurring in the absence of the brake command.

9 Claims, 3 Drawing Sheets

(51) Int. Cl.
*G08G 1/0965* (2006.01)
*G08G 1/00* (2006.01)
*G05D 1/02* (2020.01)

(58) Field of Classification Search
CPC .. G05D 1/0295; G05D 1/0289; G05D 1/0297;
B60T 8/17616; B60T 8/176; B60T
13/662; B60T 13/68; B60T 13/66; B60T
8/1701; B60T 8/72; B60T 8/268; B60T
8/3655; B60T 8/4818; B60T 13/683;
B60T 8/1708; B60W 10/18
See application file for complete search history.

(56) References Cited

U.S. PATENT DOCUMENTS

| | | | |
|---|---|---|---|
| 6,505,110 | B1 | 1/2003 | Yoshino |
| 6,955,409 | B2 | 10/2005 | Neuhaus et al. |
| 8,521,391 | B2 | 8/2013 | Krueger et al. |
| 8,706,376 | B2 | 4/2014 | Ono et al. |
| 9,085,287 | B2 | 7/2015 | Moore et al. |
| 9,665,102 | B2 | 5/2017 | Switkes et al. |
| 11,106,220 | B2 * | 8/2021 | Switkes .............. B60W 10/184 |
| 2010/0094509 | A1 | 4/2010 | Luke et al. |
| 2011/0246029 | A1 | 10/2011 | Villemin et al. |
| 2011/0307130 | A1 * | 12/2011 | Gow ....................... B60L 50/52 701/22 |
| 2016/0280190 | A1 | 9/2016 | Franz |
| 2018/0188746 | A1 | 7/2018 | Lesher et al. |
| 2018/0210463 | A1 * | 7/2018 | Switkes ............... G05D 1/0293 |
| 2018/0374366 | A1 * | 12/2018 | Reimann .................. G08G 1/22 |
| 2020/0201356 | A1 * | 6/2020 | Schuh ....................... B60T 7/12 |
| 2020/0361429 | A1 * | 11/2020 | Jahnke .................. B60R 16/023 |
| 2021/0232157 | A1 * | 7/2021 | Dieckmann .......... G05D 1/0293 |

FOREIGN PATENT DOCUMENTS

| | | | |
|---|---|---|---|
| SU | 1022838 A | 6/1983 | |
| WO | WO-2018043519 A1 * | 3/2018 | ............... B60T 7/12 |

OTHER PUBLICATIONS

Sharkawy, Abdel Badie, "Genetic Fuzzy Self-Tuning PID Controllers for Antilock Braking Systems," 23 Engineering Applications of Artificial Intelligence pp. 1041-1052 (2010).
English langage (machine) translation of CN 101414188 A.
English language (machine) translation of DE 10 2005 051 436 A1.
English language (machine) translation of SU 1022838 A1.

* cited by examiner

SYSTEM AND METHOD FOR CONTROLLING WHEEL BRAKES IN A VEHICLE PLATOONING WITH ANOTHER VEHICLE

BACKGROUND OF THE INVENTION a. Field of the Invention

This invention relates to a system and method for controlling wheel brakes in a vehicle. In particular, the invention relates to a system and method for controlling wheel brakes in a vehicle platooning with another vehicle in a manner that optimizes normal and anti-lock braking during platooning.

b. Background Art

Many conventional commercial vehicles such as box trucks and tractor-trailers are equipped with systems that allow the vehicles to engage in platooning with other vehicles. In a platoon, two or more vehicles travel closely together in substantially the same direction and at substantially the same speed. Platooning has a number of benefits including automated braking that can be implemented more quickly than operator-directed braking, a reduction in fuel consumption and harmful emissions, and improved traffic flows. In a platoon, the leading vehicle establishes the direction and speed while the following vehicles match that direction and speed. Changes in direction and speed are communicated between the vehicles using a dedicated short-range wireless communications system.

Conventional commercial vehicles also include a variety of advanced driver assistance systems (ADAS) that assume control, or supplement operator control, of various vehicle systems based on conditions associated with the vehicle, the road surface, and objects that surround the vehicle including pedestrians, other vehicles and road infrastructure. One exemplary system is an anti-lock braking systems (ABS) that helps prevent wheel slip and maintains the stability of the vehicle during braking. The ABS system includes a plurality of valves that control the delivery of fluid pressure to the wheel brakes and a controller that controls the position of each valve to control application of the wheel brakes and implement anti-lock braking.

In both normal braking and anti-lock braking, the brake controller is configured to balance a number of factors when actuating the wheel brakes including, for example, stopping distance, stability and steerability of the vehicle. In conventional vehicles, the controller implements normal braking and anti-lock braking in the same manner regardless of changes in the operating characteristics of the vehicle or changes in the operating environment. As a result, the controller must be programmed in such a way that braking will be effective on a wide variety of road surfaces (having different coefficients of friction), in varying weather conditions (e.g., dry and wet) and despite potential changes to the vehicle itself resulting from wear, maintenance, changes in load, etc. Because the controller is programmed to implement braking under a wide variety of varying conditions, conventional vehicles fail to optimize the effectiveness of normal braking and anti-lock braking in specific conditions such as when a vehicle is involved in a platoon.

The inventors herein have recognized a need for a system and method for controlling wheel brakes in a vehicle platooning with another vehicle that will minimize and/or eliminate one or more of the above-identified deficiencies.

BRIEF SUMMARY OF THE INVENTION

This invention relates to a system and method for controlling wheel brakes in a vehicle. In particular, the invention relates to a system and method for controlling wheel brakes in a vehicle platooning with another vehicle in a manner that optimizes braking during platooning.

A system for controlling wheel brakes in a first vehicle in a platoon with a second vehicle in accordance with one embodiment includes a transceiver configured for mounting in the first vehicle and configured to receive a brake command signal to apply a wheel brake in the first vehicle from the second vehicle in the platoon. The system further includes a controller configured for mounting in the first vehicle and configured to receive the brake command signal from the transceiver. The controller is further configured to generate, responsive to the brake command signal, a first set of control signals to control delivery of fluid pressure to the wheel brake and implement a braking event in accordance with a first normal braking profile. The first normal braking profile differs from a second normal braking profile used by the controller during braking events occurring in the absence of the brake command signal. In accordance with another embodiment, the controller is further configured to detect a wheel slip condition indicative of slip in a wheel of the first vehicle during the braking event and to generate, when the wheel slip condition occurs, a second set of control signals to control delivery of fluid pressure to the wheel brake in accordance with a first anti-lock braking profile. The first anti-lock braking profile differs from a second anti-lock braking profile used by the controller during braking events occurring in the absence of the brake command signal.

An article of manufacture in accordance with one embodiment includes a non-transitory computer storage medium having a computer program encoded thereon that when executed by a controller controls wheel brakes in a first vehicle in a platoon with a second vehicle. The computer program includes code for receiving a brake command signal to apply a wheel brake in the first vehicle from a transceiver mounted in the first vehicle, the transceiver configured to receive the brake command signal from the second vehicle in the platoon. The computer program further includes code for generating, responsive to the brake command, a first set of control signals to control delivery of fluid pressure to the wheel brake and implement a braking event in accordance with a first normal braking profile. The first normal braking profile differs from a second normal braking profile used by the controller during braking events occurring in the absence of the brake command signal. In accordance with another embodiment, the computer program further includes code for detecting a wheel slip condition indicative of slip in a wheel of the first vehicle during the braking event and generating, when the wheel slip condition occurs, a second set of control signals to control delivery of fluid pressure to the wheel brake in accordance with a first anti-lock braking profile. The first anti-lock braking profile differs from a second anti-lock braking profile used by the controller during braking events occurring in the absence of the brake command signal.

A method of controlling wheel brakes in a first vehicle in a platoon with a second vehicle in accordance with one embodiment includes the step of receiving a brake command signal to apply a wheel brake in the first vehicle from the second vehicle over a communications channel between the first vehicle and the second vehicle in the platoon. The method further includes the step of generating, responsive to the brake command signal, a first set of control signals to control delivery of fluid pressure to the wheel brake and implement a braking event in accordance with a first normal braking profile. The first normal braking profile differs from a second normal braking profile used by the controller during braking events occurring in the absence of the brake command signal. In accordance with another embodiment, the method further includes the steps of detecting a wheel slip condition indicative of slip in a wheel of the first vehicle during the braking event and generating, when the wheel slip condition occurs, a second set of control signals to control delivery of fluid pressure to the wheel brake in accordance with a first anti-lock braking profile. The first anti-lock braking profile differs from a second anti-lock braking profile used during braking events occurring in the absence of the brake command.

A system and method for controlling wheel brakes in a vehicle platooning with another vehicle in accordance the present teachings represent an improvement as compared to conventional systems and methods. In particular, the system and method disclosed herein enable use of a dedicated normal and anti-lock braking methodology during platooning. As a result, normal and anti-lock braking can be optimized for typical platooning conditions including the use of automated (and faster) braking in response to commands from another vehicle as opposed to operator actions and operation on road surfaces having a relatively high coefficient of friction.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
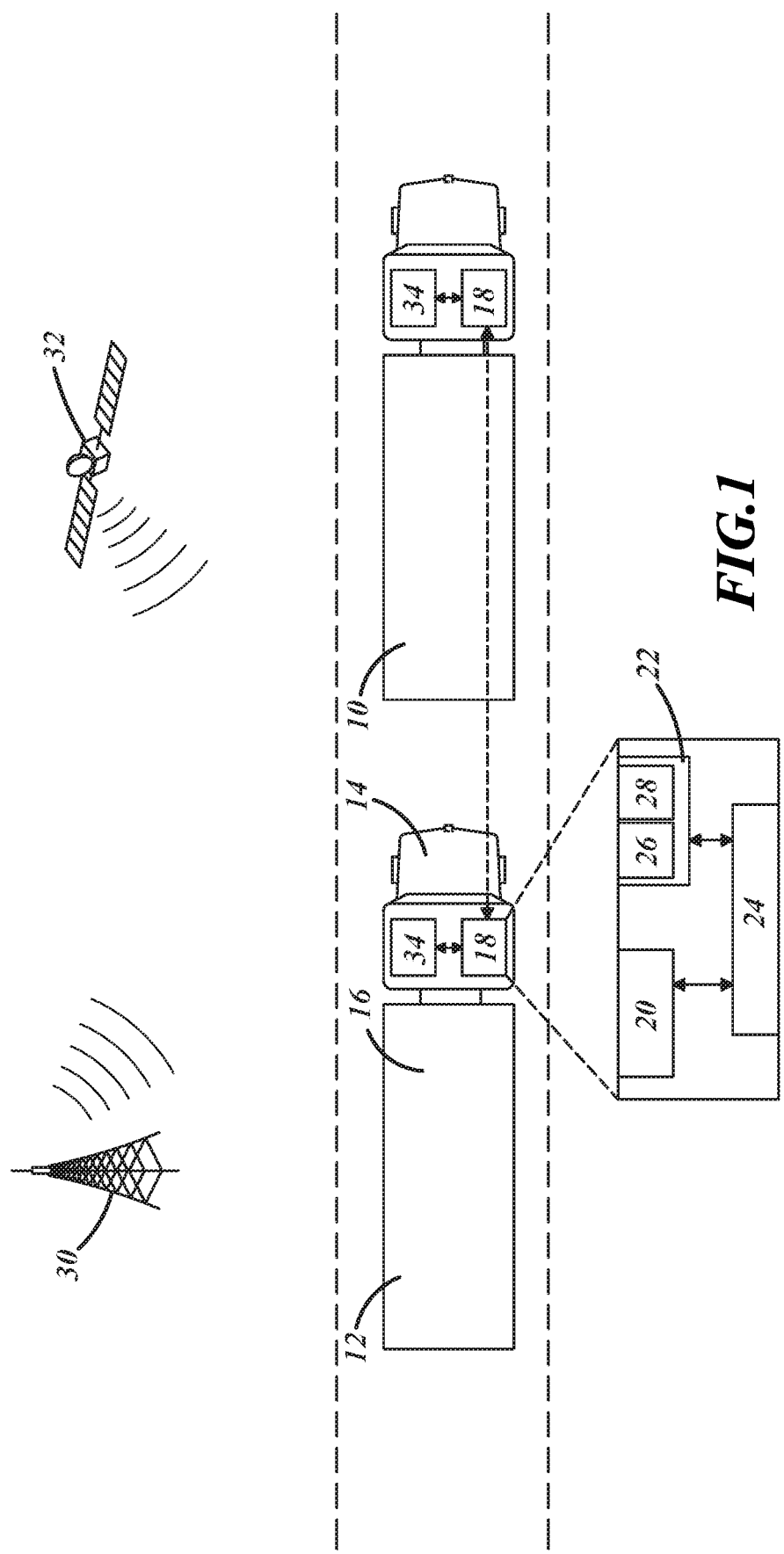
FIG. 1 is a diagrammatic view of a plurality of commercial vehicles operating as a platoon.

Referring now to the drawings wherein like reference numerals are used to identify identical components in the various views, FIG. 1 illustrates two commercial vehicles 10, 12 operating as a "platoon" in which the vehicles 10, 12 communicate with one another to establish and maintain similar speeds and directions of travel in order to minimize the distance between the vehicles 10, 12. Vehicle 10 is sometimes referred to herein as a leading vehicle because of its forward position in the platoon and in the direction of travel relative to vehicle 12 while vehicle 12 is sometimes referred to herein as a following vehicle. Although only two vehicles 10, 12 are shown in the illustrated embodiment, it should be understood that a platoon may include more than two vehicles. Further, although the platoon is shown as encompassing vehicles operating in a single roadway lane, it should be understood that vehicles may operate in a platoon over multiple roadway lanes in certain circumstances. In the illustrated embodiment, vehicle 12 comprises a tractor-trailer containing a tractor or power unit 14 and one or more trailers or towed units 16. Vehicle 10 may have a similar configuration. Tractor 14 contains a power unit, such as an internal combustion engine, and steering and drive axles each of which support one or more wheels at either end. Trailers 16 are provided to store freight and are detachably coupled to tractor 14. Each trailer 16 is supported on one or more trailer axles, each of which may support one or more wheels at either end. Although vehicle 12 includes a single trailer 16 in the illustrated embodiment, it should be understood that the number of trailers 16 attached to tractor 14 of vehicle 12 may vary. It should also be understood that vehicles 10, 12 may comprise other forms of commercial vehicles such including, for example, box trucks or buses.

Each of vehicles 10, 12 includes a platoon control system 18. In the illustrated embodiment, the platoon control system 18 for following vehicle 12 is illustrated, but it should be understood that leading vehicle 10 may have a similar system 18. System 18 may include an input/output interface 20, a communications module 22, and a controller 24. Some or all of interface 20, module 22 and controller 24 may be part of another vehicle system including the vehicle braking system for vehicle 12 described hereinbelow. Controller 24, for example, may comprise the controller associated with the Bendix® ABS-6™ Advanced Antilock Brake controller with ESP® Stability System available from Bendix Commercial Vehicle Systems LLC of Elyria, Ohio.

Input/output interface 20 is provided for collection of data used by controller 24 in establishing and maintaining the platoon and for output of commands to other vehicle systems used in controlling the operation of vehicle 12. Interface 20 may communicate with other devices and systems within vehicle 12 over a conventional vehicle communication bus such as a controller area network (CAN) (or another communication medium such as power line communication (PLC)). Interface 20 may receive inputs from a variety of sources providing information about the operation of vehicle 12 including, for example, various sensors such as wheel speed sensors, lateral acceleration sensors, steer angle sensors, brake pressure sensors, vehicle load sensors, yaw rate sensors, tire pressure management sensors, and collision avoidance sensors (which may comprise, for example, RADAR devices, LIDAR devices or cameras). Interface 20 may also receive inputs from user interfaces through which the vehicle operator can input data regarding the configuration of the vehicle 12 (e.g., number and type of trailers attached to a tractor) and/or direct the operation of vehicle 12. Interface 20 may transmit outputs used in controlling various vehicle systems such as the engine throttle and braking systems.

Communications module 22 enables communication between vehicle 12 and other vehicles including vehicle 10 (V2V communication), road infrastructure (V2I communication) and various telecommunications networks. Module 22 enables wireless voice and/or data communication over a wireless carrier system and via wireless networking. In some embodiments, module 22 may comprise or form a part of a vehicle telematics unit used to provide a diverse range of services including turn-by-turn directions and other navigation-related services that are provided in conjunction with a GPS-based vehicle navigation system, airbag deployment or collision notification and other emergency or roadside assistance-related services, and diagnostic reporting using information obtained from various vehicle control systems. In accordance with the disclosed embodiments, module 22 is used for communication with other vehicles to establish and manage a platoon. Therefore, module 22 may include a short range wireless communication transceiver 26 that is configured for communication over a relatively short distance using short-range wireless technologies such as Wi-Fi (IEEE 802.11), WiMAX, Wi-Fi direct, Bluetooth, Zigbee, near field communication (NFC), etc. and that transmits and receives signals through an antenna. In accordance with some embodiments, transceiver 26 is configured to allow vehicle to vehicle communication in accordance with Society of Automotive Engineering (SAE) Standard J2945 directed to Dedicated Short Range Communication. Module 22 may further include a long-range wireless communication transceiver 28 that is configured for communication over long distances through a cellular communications network 30 or satellite communication network 32 for vehicle navigation, diagnostic reporting, fleet management and other purposes. According to one embodiment, transceiver 28 is used for cellular communication according to either GSM, CDMA, UMTS or LTE standards and therefore includes a standard cellular chipset for voice communications, a wireless modem (not shown) for data transmission, and a radio transceiver that transmits signals to and receives signals from a dual antenna for wireless communication with network 30.

Controller 24 is provided to control the operation of vehicle 12 within the platoon. Controller 24 generates control signals for various control systems on vehicle 12 responsive to inputs received through interface 20 and communications module 22 in order to control the speed, acceleration and deceleration (braking) of vehicle 12 and the direction of travel of vehicle 12 and establish, maintain and manage the platoon with other vehicles. Controller 24 also forms commands and other communications for transmission by communications module 22 to other vehicles such as vehicle 10, surrounding infrastructure and telecommunications systems 30, 32. Controller 24 may comprise a programmable microprocessor or microcontroller or may comprise an application specific integrated circuit (ASIC). Controller 24 may include a memory and a central processing unit (CPU). Controller 24 may also include an input/output (I/O) interface including a plurality of input/output pins or terminals through which the controller may receive a plurality of input signals and transmit a plurality of output signals. The input signals may include signals received from interface 20 and module 22 while the output signals may include signals transmitted through interface 20 to various vehicle control systems and user interfaces on vehicle 12 and through module 22 to other vehicles, infrastructure and telecommunications networks. Controller 24 may determine an appropriate distance between vehicle 12 and vehicle 10 responsive to various factors associated with the operational capability of the individual vehicles (e.g., braking capabilities, acceleration capabilities, loads), characteristics of the platoon itself (e.g., the size of the platoon) and characteristics of the operating environment (e.g., road surfaces, changes in road elevation, turns in the road, and weather).

Figure 2:
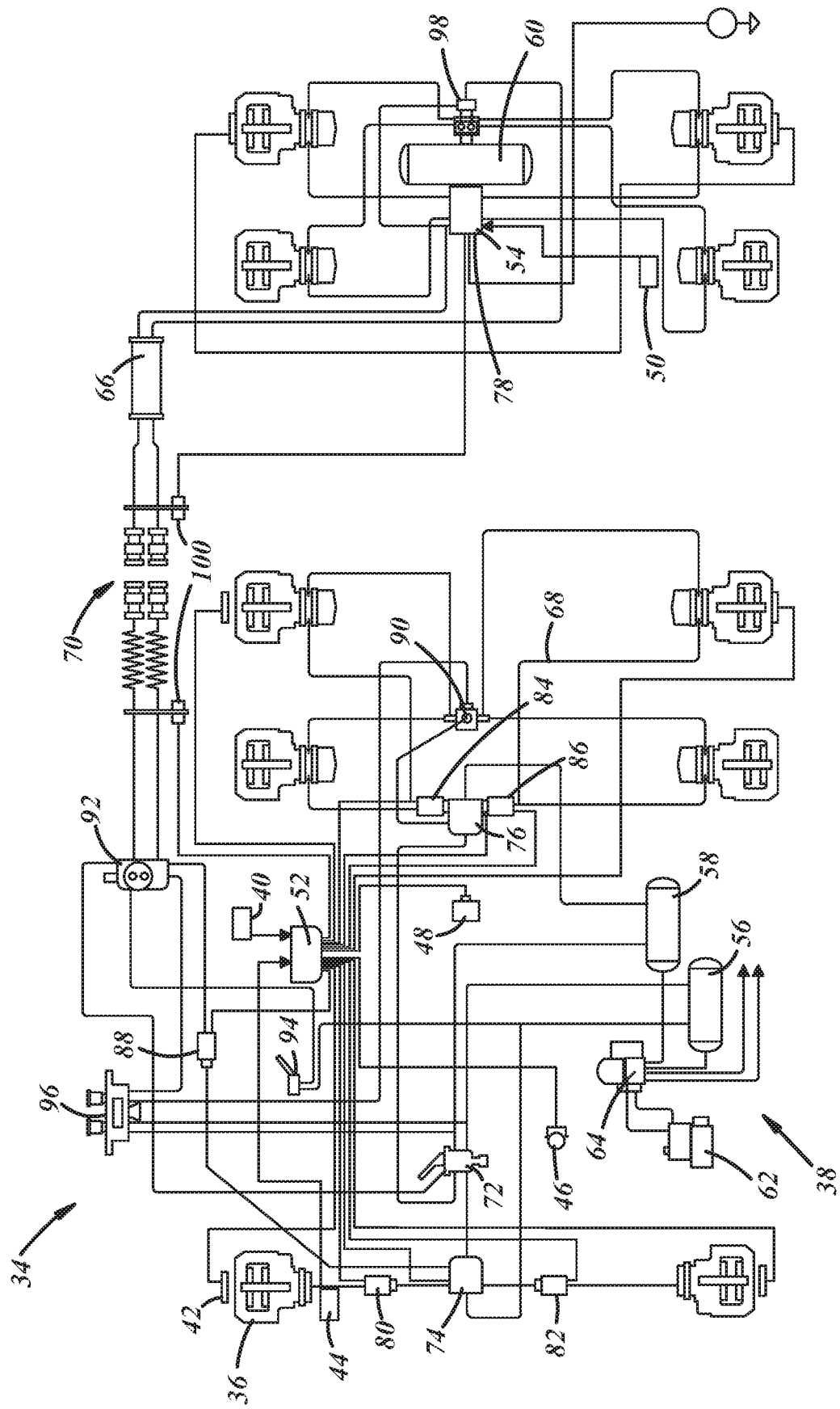
FIG. 2 is a diagrammatic view of a commercial vehicle incorporating a system for controlling wheel brakes in a vehicle platooning with another vehicle in accordance with one embodiment of the present teachings.

Following vehicle 12 may further include a braking system 34 configured to brake wheels on tractor 14 and trailers 16 in order to slow or stop movement of vehicle 12. It should be understood that leading vehicle 10 may have a similar braking system 34. System 34 may comprise an anti-lock braking system (ABS). In accordance with the present teachings, system 34 is configured to control the delivery of fluid pressure to the wheel brakes in response to a brake command signal from the leading vehicle 10 in the platoon in accordance with normal and anti-lock braking profiles that differ from the normal and anti-lock braking profiles used during braking events occurring in the absence of the brake command signal from the leading vehicle 10. System 34 may include components on both tractor 14 and trailer 16 that may be in fluid and/or electrical communication using conventional connectors between tractor 14 and trailer 16. Referring now to FIG. 2, braking system 34 may include wheel brakes 36, a fluid circuit 38 that supplies fluid pressure to wheel brakes 36, various sensors including vehicle speed sensors such as an engine or transmission speed sensor 40 and wheel speed sensors 42, pressure sensors 44, a steer angle sensor 46, a yaw rate sensor 48, and load sensors 50, and one or more controllers 52, 54.

Wheel brakes 36 are configured to apply a braking force to the wheels on vehicle 12. In the illustrated embodiment, brakes 36 comprise disc brakes in which a carrier supports brake pads on opposite sides of a rotor rotating with the wheel and an actuator causes, responsive to fluid pressure delivered by fluid circuit 38, movement of a caliper relative to the carrier to move the brake pads into and out of engagement with the rotor. It should be understood, however, that one or more of wheel brakes 36 may alternatively comprise drum brakes in which an actuator such as a cam or piston causes, responsive to fluid pressure delivered by fluid circuit 38, movement of one or more brake shoes into engagement with a braking surface in a brake drum rotating with the wheel.

Fluid circuit 38 generates fluid pressure within system 34 and controls the delivery of fluid pressure to the actuator of each wheel brake 36. Circuit 38 may include components for generating and storing pressurized fluid including fluid reservoirs 56, 58, 60, a compressor 62, and air dryers 64, 66 and components for routing and delivering fluid pressure to wheel brakes 36 including fluid conduits 68, glad-hand connectors 70 between tractor 14 and trailer 16, and various valves including food pedal valve 72, relay valves 74, 76, 78, modulator valves 80, 82, 84, 86, 88, quick release valve 90, tractor protection valve 92, trailer control valve 94, dash control valve 96 and trailer parking control valve 98.

Fluid reservoirs 56, 58, 60 store compressed fluid for use in applying wheel brakes 36. Reservoir 56 supplies pressurized fluid to the wheel brakes for the steer axle and has a fluid port coupled to air dryer 64 and fluid ports coupled to foot pedal valve 72, relay valve 74 and trailer control valve 94. Reservoir 58 supplies pressurized fluid to the wheel brakes for the drive axles and has a fluid port coupled to air dryer 64 and fluid ports coupled to foot pedal valve 72 and relay valve 76. Reservoir 60 supplies pressurized fluid to the wheel brakes for the trailer axles has a fluid port coupled to trailer parking control valve 98.

Compressor 62 draws in air and compresses the air for delivery to reservoirs 56, 58 through air dryer 64. Compressor 62 has one or more fluid ports coupled to air dryer 64.

Air dryers 64, 66 are provided to collect and remove solid, liquid and vapor contaminants from pressurized fluid. Air dryer 64 is disposed between compressor 62 and reservoirs 56, 58 and has fluid ports coupled to compressor 62 and each reservoir 56, 58. Air dryer 66 is supported on trailer 16 between glad-hand connectors 70 and relay valve 78 and has fluid ports coupled to glad-hand connectors 70 and relay valve 78. Air dryer 66 assists in removing contaminants from the fluid in situations where tractor 14 lacks an air dryer and/or when trailer 16 becomes disconnected from tractor 14.

Fluid conduits 68 are used to transport fluid between reservoirs 56, 58, 60, compressor 62, air dryers 64, 66, glad-hand connectors 70, valves 72, 74, 76, 78, 80, 82, 84, 86, 88, 90, 92, 94, 96, 98 and wheel brakes 36. Conduits 68 may be made from conventional metals and/or plastics and have connectors at either end configured to join the conduits 68 to corresponding components of circuit 38.

Glad-hand connectors 70 are used to transmit pressurized fluid from tractor 14 to trailer 16. One of connectors 70 is used to transmit fluid used during emergency braking while the other connector 70 is used to transmit fluid used during service braking.

Foot pedal valve 72 is provided to allow controlled application of the brakes 36 by the vehicle operator by selectively releasing fluid pressure from fluid reservoirs 56, 58. Valve 72 is supported within the cabin of tractor 14. Actuation of valve 72 by the vehicle operator allows fluid pressure to flow from reservoirs 56, 58 to relay valves 74, 76 and/or tractor protection valve 92 and valve 72 therefore has fluid ports in communication with reservoirs 56, 58 and valves 74, 76, 92.

Relay valves 74, 76, 78 increase the volume of fluid, and therefore the speed, at which fluid is delivered to, and exhausted from, wheel brakes 36 in order to eliminate lag times between the commanded and actual application and release of brakes 36. Relay valve 74 has fluid ports in communication with food pedal valve 72, reservoir 56 and modulator valves 80, 82, 88. Relay valve 76 has fluid ports in communication with food pedal valve 72, reservoir 58, modulator valves 84, 86 and quick release valve 90. Relay valve 78 has fluid ports in communication with air dryer 66, trailer parking control valve 98 and each wheel brake 36. Relay valve 78 may be integrated with a modulator valve and controller 54 in some embodiments. Relay valves 74, 76 and 78 may operate under the control of controllers 52, 54 to implement anti-lock braking/traction control when required.

Modulator valves 80, 82, 84, 86, 88 are provided to implement an anti-lock braking function. During normal braking, valves 80, 82, 84, 86, 88 allow fluid pressure to pass from relay valves 74, 76 to wheel brakes 36 without interference. During a loss of traction, however, signals from controller 52 causes valves 80, 82, 84, 86, 88 to modulate the fluid pressure to prevent lockup of the wheels. Modulator valves 80, 82 have fluid ports coupled to relay valve 74 and to wheel brakes 36 on the steer axle. Modulator valves 84, 86 have fluid ports coupled to relay valve 76 and to wheel brakes 36 on the drive axle. Finally, modulator valve 88 has fluid ports in communication with relay valve 74 and tractor protection valve 92. Modulator valves 80, 82, 84, 86, 88 may assume several positions including a hold position preventing fluid pressure from proceeding to the wheel brakes 36, an apply position allowing fluid pressure to proceed to the wheel brakes 36 and a release position that releases or bleeds fluid pressure from the wheel brake 36.

Quick release valve 90 increases the speed at which fluid pressure is exhausted from wheel brakes 36 on drive axle 18 when brakes 34 are released. Valve 90 has fluid ports in communication with wheel brakes 36 on the drive axle and dash control valve 96.

Tractor protection valve 92 transmits pneumatic signals relating to operation of the trailer wheel brakes 36 from the tractor 14 to the trailer 16. Valve 92 also protects the fluid supply for tractor 14 in the event of a brake in the fluid connection between tractor 14 and trailer 16. Valve 92 has fluid ports in communication with foot pedal valve 72, modulator valve 88, trailer control valve 94, dash control valve 96, and glad-hand connectors 70.

Trailer control valve 94 allows the vehicle operator to control wheel brakes 36 on trailer 16 independent of the wheel brakes 36 on tractor 14. Valve 94 may be mounted within the cab of tractor 14 and permits delivery of fluid directly from reservoir 56 to tractor protection valve 92 for delivery to wheel brakes 36 in trailer 16. Valve 94 has fluid ports in communication with reservoir 56 and tractor protection valve 92.

Dash control valve 96 allows the vehicle operator to implement several functions including releasing parking brakes on tractor 14 or trailer 16 by supplying fluid pressure to oppose spring forces in the actuators for wheel brakes 36. Valve 96 has fluid ports in communication with reservoirs 56, 58, quick release valve 90 and tractor protection valve 92.

Trailer parking control valve 98 is provided to control the parking or emergency braking function of the actuators for the wheel brakes 36 on trailer 16. Valve 98 is mounted directly to reservoir 60. Valve 98 has fluid ports in communication with the reservoir 60, air dryer 66 and wheel brakes 36 on trailer 16.

Engine or transmission speed sensor 40 generates a signal indicative of the speed of vehicle 12. Sensor 40 may comprise one or more magnets configured to track the rotation of a driveshaft or similar component in the drivetrain for tractor 14 and generate signals indicative of the speed of rotation. A controller, such as controller 52 can then determine the speed of vehicle 12 responsive to the signal.

Wheel speed sensors 42 generate signals indicative of the rotational speed of a corresponding wheel on vehicle 10. Each sensor 42 may include a magnet surrounded by a coil disposed proximate to a toothed ring on a wheel. Rotation of the toothed ring causes changes in the direction and intensity of the magnetic fields and is indicative of rotation of the wheel. Controllers 52, 54 can determine the rotational speed of each wheel responsive to signals generated by sensors 42. Based on the rotational speed of wheels 22, controllers 52, 54 can determine whether certain wheels are slipping and implement anti-lock braking through control of relay valves 74, 76, 78 and modulator valves 80 82, 84, 86, 88. Controllers 52, 54 can also determine the speed of vehicle 12 responsive to the determined speed of the wheels.

Pressure sensors 44 generate signals indicative of the fluid pressure at various locations within fluid circuit 38. Although only one pressure sensor 44 is illustrated in FIG. 2, it should be understood that pressure sensors 44 may be located throughout fluid circuit 38.

Steer angle sensor 46 outputs a signal indicative of a steering angle imparted by a vehicle operator to a steering wheel in tractor 14. Sensor 46 may be mounted on a steering column within tractor 14.

Yaw rate sensor 48 generates a signal indicative of the angular velocity of tractor 14 about its vertical (yaw) axis. An electronic stability control system may compare the output of sensors 46, 48 to determine whether the intended direction of travel for vehicle 12 (as indicated by sensor 46) matches the actual direction of travel (as indicated by sensor 48) and thereby determine whether there has been a loss of traction between the wheels and the road. When the intended and actual directions of vehicle 12 diverge, the system generates control signals for one or both of the vehicle engine and the wheel brakes 36 in order to control the torque at one or more of the wheels so that the actual direction of vehicle 12 will match the intended direction.

Load sensor 50 generates a signal indicative of the forces at a given location. Load sensor 50 may, for example, be used to determine the load on one or more of the trailer axles in order to assist in determining the stability of trailer 16.

Load sensor 50 may comprise a strain gauge, piezoelectric sensor or a fluid (hydraulic or pneumatic) sensor.

Controllers 52, 54 control the operation of relay valves 74, 76, 78 and modulator valves 80, 82, 84, 86, 88 in order to control the fluid pressure delivered to wheel brakes 36 and, therefore, the braking force applied to the wheels in vehicle 12. Controllers 52, 54 may also perform some or all of the functions of controller 24 of platoon control system 18 described above. Controllers 52, 54 may comprise programmable microprocessors or microcontrollers or may comprise application specific integrated circuits (ASICs). Each controller 52, 54 may include a memory and a central processing unit (CPU). Each controller 52, 54 may also include an input/output (I/O) interface including a plurality of input/output pins or terminals through which the controller 52, 54 may receive a plurality of input signals and transmit a plurality of output signals. The input signals may include signals received from controller 24 in platoon control system 18 and from sensors 40, 42, 44, 46, 48, 50. The output signals may include signals used to control relay valves 74, 76, 78, and modulator valves 80, 82, 84, 86, 88. In the illustrated embodiment, tractor 14 and trailer 16 include separate controllers 52, 54 that may communicate with one another across an electrical connector 100 between tractor 14 and trailer 16. It should be understood, however, that the functionality of controllers 52, 54 could be combined into a single controller or further sub-divided among multiple sub-controllers. In accordance with the present teachings, one or both of controllers 52, 54 may be configured with appropriate programming instructions (i.e., software or a computer program) to implement several steps in a method for controlling the wheel brakes 36 on vehicle 12 while vehicle 12 is a platoon with another vehicle such as vehicle 10 as described below.

Figure 3:
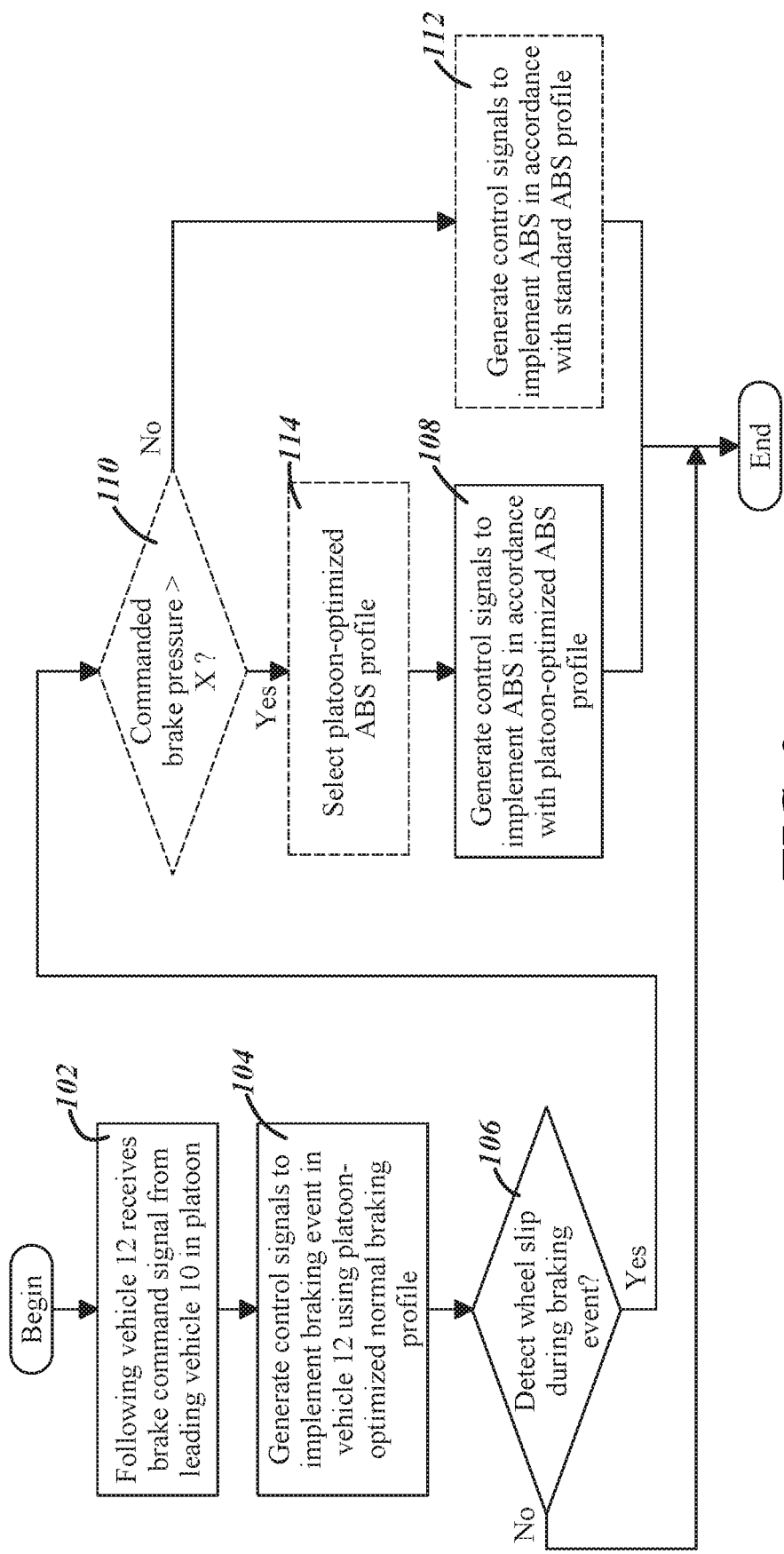
FIG. 3 is flow chart diagram illustrating several steps in a method for controlling wheel brakes in a vehicle in a platoon with another vehicle in accordance with one embodiment of the present teachings.

Referring now to FIG. 3, one embodiment of a method for controlling the wheel brakes 36 on a vehicle 12 in a platoon with another vehicle 10 may begin with the step 102 of receiving a brake command signal to apply a wheel brake 36 in the following vehicle 12 from the leading vehicle 10. The signal may be received over a short range wireless communications channel between the leading vehicle 10 and the following vehicle 12. As discussed above, each of vehicles 10, 12 may include a platoon control system 18 including a communications module 20 having a short-range wireless communication transceiver 26. Vehicles 10, 12 can establish a communication channel in a conventional manner and communicate with one another over the channel using transceivers 26 in vehicles 10, 12. During operation of the platoon, the leading vehicle 10 will communicate information and commands to the following vehicle 12 in order to establish the speed and direction of travel (among other parameters) of the platoon. Under various circumstances, the leading vehicle 10 may transmit a brake command signal to the following vehicle 12 instructing the following vehicle 12 to apply the wheel brakes 36 on vehicle 12 (e.g., due to the presence of another vehicle, pedestrian or object in front of the leading vehicle 10, due to a change in the direction or grade of the road, or due to a change in weather conditions or other events that reduce the coefficient of friction between the vehicles 10, 12 in the platoon and the road).

The method may continue with the step 104 of generating, responsive to the brake command signal, a set of control signals to control delivery of fluid pressure to the wheel brake 36 and implement a braking event. The brake command signal received by transceiver 26 in vehicle 12 may be provided to one or both of controllers 52, 54. In response to the signal, one or both of controllers 52, 54 may generate control signals to one or more of relay valves 74, 76, 78 and modulator valves 80, 82, 84, 86, 88 to deliver fluid pressure to the wheel brakes 36 and implement a braking event. Controllers 52, 54 may vary the level of fluid pressure and other parameters associated with the braking event depending on the information included in the braking command signal received from the leading vehicle 10. In accordance with one aspect of the present teachings, controllers 52, 54 are programmed to generate the control signals in accordance with a specific normal (i.e., other than anti-lock) braking profile that is optimized for platooning. The profile may comprise a set of executable instructions for controllers 52, 54 or a set of parameter values used by controller 52, 54 during execution of such instructions and may be stored in a memory of controllers 52, 54 or an external memory accessible by controllers 52, 54. In conventional vehicles, the controllers 52, 54 may generate control signals in response to commands from advanced driver assistance systems (ADAS) on vehicle 12 in accordance with a normal braking profile configured to provide effective braking on a wide variety of road surfaces (having different coefficients of friction), in varying weather conditions (e.g., dry and wet) and despite potential changes to the vehicle itself resulting from wear, maintenance, changes in load, etc. Vehicle platoons, however, typically operate within a limited range of conditions because of the relatively small spacing between the vehicles. In particular, platooning may only be permitted on road surfaces having a relatively high coefficient of friction (e.g., concrete and asphalt) and in weather conditions that maintain a high coefficient of friction (e.g., dry weather). The normal braking profile used in conventional brake controllers fails to optimize the effectiveness of braking in the conditions in which platooning occurs. In accordance with the present teachings, system 34 is configured to control the delivery of fluid pressure to the wheel brakes in response to a brake command signal from the leading vehicle 10 in the platoon in accordance with a normal braking profile that differs from the normal braking profile used during braking events occurring in the absence of the brake command signal from the leading vehicle 10. This platoon-optimized normal braking profile is optimized for the conditions typically found during platooning. In particular, because of the conditions in which platooning occurs generally involve a relatively high coefficient of friction between the road surface and vehicles 10, 12, the platoon-optimized normal braking profile results in control of relay valves 74, 76, 78 and modulator valves 80, 82, 84, 86, 88 in a manner that takes advantage of the existence of the high coefficient of friction. The platoon-optimized normal braking profile may establish values for various parameters associated with normal braking that differ from those in a standard normal braking profile including, for example, brake pressure rates, magnitudes and maximums.

The method may continue with the step 106 in which one or more of the controllers 52, 54 detect a wheel slip condition indicative of slip in a wheel of the following vehicle 12 during the braking event. As noted above, braking system 34 may comprises an anti-lock braking system (ABS). Controllers 52, 54 are configured to monitor the rotational speed of each wheel through, for example, wheel speed sensors 42 and to determine when one or more wheels are rotating at a greater or lesser speed than other wheels. In accordance with one aspect of the present teachings, the difference in wheel speeds required to trigger a determination by controllers 52, 54 that a wheel slip condition exists in circumstances where a brake command signal has been received from leading vehicle 10 may vary from the difference in wheel speeds required to trigger a determination that a wheel slip condition exists during braking events occurring in the absence of the brake command signal from the leading vehicle 10.

In response to a wheel slip condition, the controllers 52, 54 will modify the fluid pressure to the wheel that is rotating at a different speed to change the speed of the wheel to match the speed of the other wheels. Controllers 52, 54 will generate control signals for appropriate relay valves 74, 76, 78 and/or modulator valves 80, 82, 84, 86, 88 to change the speed. In particular, controllers 52, 54 will generate control signals that establish the positions of valve elements in one or more of relay valves 74, 76, 78 and modulator valves 80, 82, 84, 86, 88 to control the fluid pressure delivered to the wheel brakes 36. In accordance with one aspect of the present teachings, controllers 52, 54 are programmed to generate the control signals in accordance with a specific anti-lock braking profile that is again optimized for platooning. The profile may comprise a set of executable instructions for controllers 52, 54 or a set of parameter values used by controller 52, 54 during execution of such instructions and may be stored in a memory of controllers 52, 54 or an external memory accessible by controllers 52, 54. In conventional vehicles, the controllers 52, 54 follow an anti-lock braking profile configured to provide effective anti-lock braking on a wide variety of road surfaces (having different coefficients of friction), in varying weather conditions (e.g., dry and wet) and despite potential changes to the vehicle itself resulting from wear, maintenance, changes in load, etc. Vehicle platoons, however, typically operate within a limited range of conditions because of the relatively small spacing between the vehicles. In particular, platooning may only be permitted on road surfaces having a relatively high coefficient of friction (e.g., concrete and asphalt) and in weather conditions that maintain a high coefficient of friction (e.g., dry weather). The general anti-lock braking profile used in conventional anti-lock brake controllers fail to optimize the effectiveness of anti-lock braking in the conditions in which platooning occurs. In accordance with the present teachings, system 34 is configured to control the delivery of fluid pressure to the wheel brakes in response to a brake command signal from the leading vehicle 10 in the platoon in accordance with an anti-lock braking profile that differs from the anti-lock braking profile used during braking events occurring in the absence of the brake command signal from the leading vehicle 10. Thus, in step 108 controllers 52, 54 are configured to generate, when a wheel slip condition occurs during a braking event implemented in response to a brake command signal from the leading vehicle 10, a set of control signals to control delivery of fluid pressure to the wheel brake 36 in accordance with an anti-lock braking profile that differs from the anti-lock braking profile used during braking events occurring in the absence of the braking command signal from the leading vehicle 10. This platoon-optimized anti-lock braking profile is optimized for the conditions typically found during platooning. In particular, because of the conditions in which platooning occurs generally involve a relatively high coefficient of friction between the road surface and vehicles 10, 12, the platoon-optimized anti-lock braking profile results in control of relay valves 74, 76, 78 and modulator valves 80, 82, 84, 86, 88 in a manner that takes advantage of the existence of the high coefficient of friction. The platoon-optimized anti-lock braking profile may establish values for various parameters associated with anti-lock braking that differ from those in a standard anti-lock braking profile including, for example, brake pressure rates, magnitudes and maximums. In particular, the profile may establish different wheel speed or acceleration thresholds at which modulator valves 80, 82, 84, 86, 88 assume apply, hold and release positions, different lengths of time during which valves 80, 82, 84, 86, 88 remain in the apply, hold and release positions, and different pressure magnitudes applied or released by valves 80, 82, 84, 86, 88.

As illustrated by the dashed step 110 in FIG. 3, in accordance with certain embodiments controllers 52, 54 may be configured to first compare a commanded braking pressure from the brake command signal received from the leading vehicle 10 to a threshold brake pressure and to proceed to step 108 only when the commanded brake pressure meets a predetermined condition relative to the threshold brake pressure (e.g., is greater than the threshold brake pressure). In these embodiments, controllers 52, 54 may be configured to implement the platoon specific anti-lock braking profile only in circumstances where, for example, a rapid deceleration of following vehicle 12, and significant fluid pressure for the wheel brakes 36 on vehicle 12, is required. If the commanded brake pressure does not meet the predetermined condition relative to the threshold brake structure, controllers 52, 54 may proceed to step 112 and generate control signals for relay valves 74, 76, 78 and modulator valves 80, 82, 84, 86, 88 in accordance with the standard anti-lock braking profile used in all other conditions. As illustrated by the dashed step 114 in FIG. 3, in accordance with certain embodiments controllers 52, 54 may further be configured to generate control signals in accordance with any one of multiple anti-lock braking profiles when vehicle 12 is operating in a platoon with vehicle 10 and during braking events implemented in response to a brake command signal from vehicle 10. Thus, controllers 52, 54 may be configured in certain embodiments to perform the step 114 of selecting an anti-lock braking profile from among a plurality of anti-lock braking profiles based on one or more factors. For example, controllers 52, 54 may select the profile based on the configuration of vehicle 12. In some embodiments, different profiles may be used depending on the type of suspension on vehicle 12 (e.g. an air bag suspension vs. a mechanical spring suspension), the type of brake (e.g., drum brakes vs. disc brakes), the wheelbase of vehicle 12, and/or the load—and distribution of the load—on vehicle 12.

A system and method for controlling wheel brakes 36 in a vehicle 12 platooning with another vehicle 10 in accordance the present teachings represent an improvement as compared to conventional systems and methods. In particular, the system and method disclosed herein enable use of a dedicated normal and anti-lock braking methodology during platooning. As a result, braking can be optimized for typical platooning conditions including the use of automated (and faster) braking in response to commands from vehicle 10 as opposed to operator actions and operation on road surfaces having a relatively high coefficient of friction.

While the invention has been shown and described with reference to one or more particular embodiments thereof, it will be understood by those of skill in the art that various changes and modifications can be made without departing from the spirit and scope of the invention.

What is claimed is:

1. A system for controlling wheel brakes in a first vehicle in a platoon with a second vehicle, comprising:
   a transceiver configured for mounting in the first vehicle and configured to receive a brake command signal to apply a wheel brake in the first vehicle from the second vehicle in the platoon; and, a controller configured for mounting in the first vehicle and configured to
  receive the brake command signal from the transceiver; and,
  generate, responsive to the brake command signal, a first set of control signals to control delivery of fluid pressure to the wheel brake and implement a braking event in accordance with a first normal braking profile wherein the first normal braking profile differs from a second normal braking profile used by the controller during braking events occurring in the absence of the brake command signal; and,
a modulator valve disposed between a pneumatic fluid source and the wheel brake, a position of the modulator valve established responsive to one or more of the first set of control signals
wherein the first normal braking profile causes the modulator valve to assume apply, hold and release positions at first corresponding speeds or accelerations of a wheel of the first vehicle and the second normal braking profile causes the modulator valve to assume the apply, hold and release positions at second corresponding speeds or accelerations of the wheel of the first vehicle different than the first corresponding speeds or accelerations
wherein the first corresponding speed or acceleration at which the modulator valve assumes the apply position is less than the second corresponding speed or acceleration at which the modulator valve assumes the apply position.

2. The system of claim 1 wherein the controller is further configured to:
  detect a wheel slip condition indicative of slip in a wheel of the first vehicle during the braking event; and,
  generate, when the wheel slip condition occurs, a second set of control signals to control delivery of fluid pressure to the wheel brake in accordance with a first anti-lock braking profile wherein the first anti-lock braking profile differs from a second anti-lock braking profile used by the controller during braking events occurring in the absence of the brake command signal.

3. The system of claim 1 wherein the controller selects the first normal braking profile from among a plurality of normal braking profiles responsive to at least one of a type of suspension on the first vehicle and a type of wheel brake on the first vehicle.

4. An article of manufacture, comprising:
a non-transitory computer storage medium having a computer program encoded thereon that when executed by a controller controls wheel brakes in a first vehicle in a platoon with a second vehicle, the computer program including code for:
  receiving a brake command signal to apply a wheel brake in the first vehicle from a transceiver mounted in the first vehicle, the transceiver configured to receive the brake command signal from the second vehicle in the platoon;
  generating, responsive to the brake command, a first set of control signals to control delivery of fluid pressure to the wheel brake and implement a braking event in accordance with a first normal braking profile wherein the first normal braking profile differs from a second normal braking profile used by the controller during braking events occurring in the absence of the brake command signal
  wherein the first set of control signals establish a position of a modulator valve disposed between a pneumatic fluid source and the wheel brake
  wherein the first normal braking profile causes the modulator valve to assume apply, hold and release positions at first corresponding speeds or accelerations of a wheel of the first vehicle and the second normal braking profile causes the modulator valve to assume the apply, hold and release positions at second corresponding speeds or accelerations of the wheel of the first vehicle different than the first corresponding speeds or accelerations
  wherein the first corresponding speed or acceleration at which the modulator valve assumes the apply position is less than the second corresponding speed or acceleration at which the modulator valve assumes the apply position.

5. The article of manufacture of claim 4 wherein the computer program further includes code for:
  detecting a wheel slip condition indicative of slip in a wheel of the first vehicle during the braking event; and,
  generating, when the wheel slip condition occurs, a second set of control signals to control delivery of fluid pressure to the wheel brake in accordance with a first anti-lock braking profile wherein the first anti-lock braking profile differs from a second anti-lock braking profile used by the controller during braking events occurring in the absence of the brake command signal.

6. The article of manufacture of claim 4 wherein the computer program further includes code for selecting the first normal braking profile from among a plurality of normal braking profiles responsive to at least one of a type of suspension on the first vehicle and a type of wheel brake on the first vehicle.

7. A method for controlling wheel brakes in a first vehicle in a platoon with a second vehicle, comprising the steps of:
  receiving a brake command signal to apply a wheel brake in the first vehicle from the second vehicle over a communications channel between the first vehicle and the second vehicle in the platoon;
    generating, responsive to the brake command signal, a first set of control signals to control delivery of fluid pressure to the wheel brake and implement a braking event in accordance with a first normal braking profile wherein the first normal braking profile differs from a second normal braking profile used by the controller during braking events occurring in the absence of the brake command signal
  wherein the first set of control signals establish a position of a modulator valve disposed between a pneumatic fluid source and the wheel brake
  wherein the first normal braking profile causes the modulator valve to assume apply, hold and release positions at first corresponding speeds or accelerations of a wheel of the first vehicle and the second normal braking profile causes the modulator valve to assume the apply, hold and release positions at second corresponding speeds or accelerations of the wheel of the first vehicle different than the first corresponding speeds or accelerations
  wherein the first corresponding speed or acceleration at which the modulator valve assumes the apply position is less than the second corresponding speed or acceleration at which the modulator valve assumes the apply position.

8. The method of claim 7, further comprising the steps of:
detecting a wheel slip condition indicative of slip in a wheel of the first vehicle during the braking event; and,
generating, when the wheel slip condition occurs, a second set of control signals to control delivery of fluid pressure to the wheel brake in accordance with a first anti-lock braking profile wherein the first anti-lock braking profile differs from a second anti-lock braking profile used during braking events occurring in the absence of the brake command.

9. The method of claim 7, further comprising the step of selecting the first normal braking profile from among a plurality of normal braking profiles responsive to at least one of a type of suspension on the first vehicle and a type of wheel brake on the first vehicle.

* * * * *